United States Patent

[11] 3,612,980

| [72] | Inventor | William L. King<br>Springfield, Oreg. |
|---|---|---|
| [21] | Appl. No. | 65,929 |
| [22] | Filed | Aug. 21, 1970 |
| [45] | Patented | Oct. 12, 1971 |
| [73] | Assignee | Nathan E. Knecht<br>Springfield, Oreg. |

[54] LIQUID JET ELECTRICAL INVERTER
15 Claims, 6 Drawing Figs.

[52] U.S. Cl. ............................................ 321/50,
200/32
[51] Int. Cl. ............................................. H02m 7/90
[50] Field of Search ............................. 200/32, 152
K; 321/48–50

[56] References Cited
UNITED STATES PATENTS

| 2,438,067 | 3/1948 | Luhn ............................ | 200/32 |
| 2,822,513 | 2/1958 | Bohm et al. ................... | 321/48 |
| 2,929,014 | 3/1960 | Bohm .......................... | 321/50 |

*Primary Examiner*—William M. Shoop, Jr.
*Attorney*—Kolisch & Hartwell

ABSTRACT: An electrical inverter employing for switching purposes a pair of stationary jets of electroconductive liquid which intermittently impinge pools of such liquid contained in recesses in a turning rotor. Different pools are connected electrically to the plus and minus terminals of a source of DC. Each jet is connected electrically to one of the two AC output terminals in the inverter.

PATENTED OCT 12 1971 3,612,980
SHEET 1 OF 2
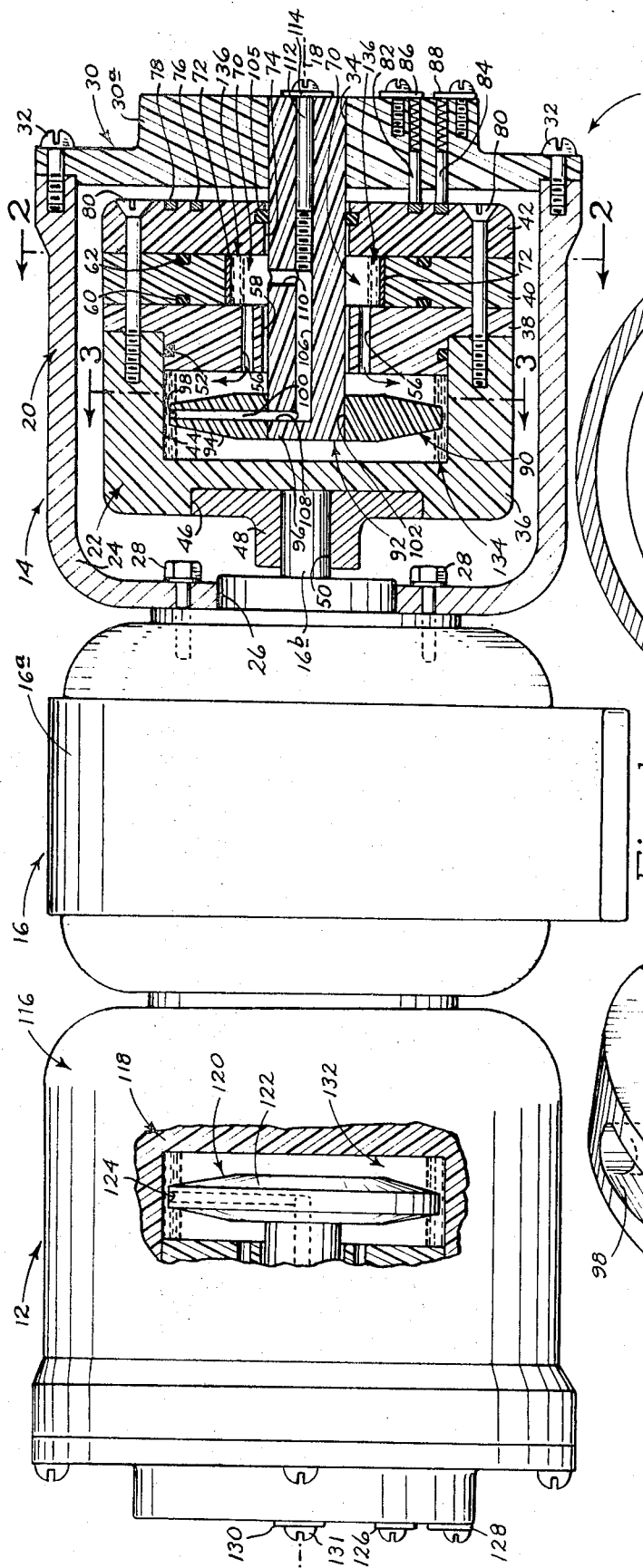
Fig. 1.
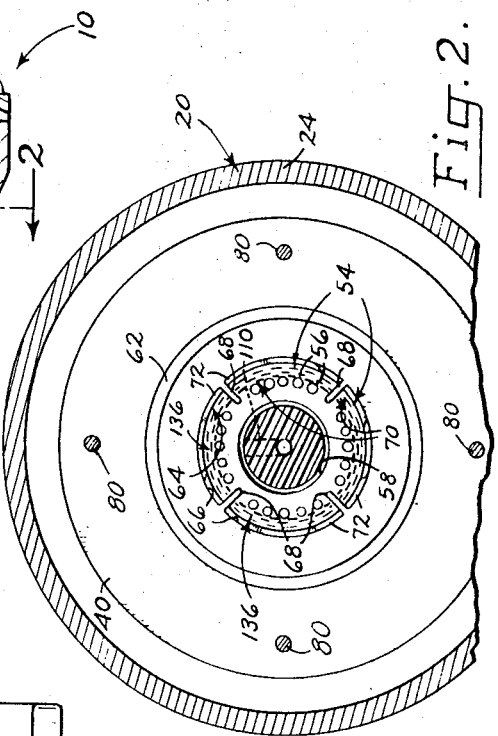
Fig. 2.
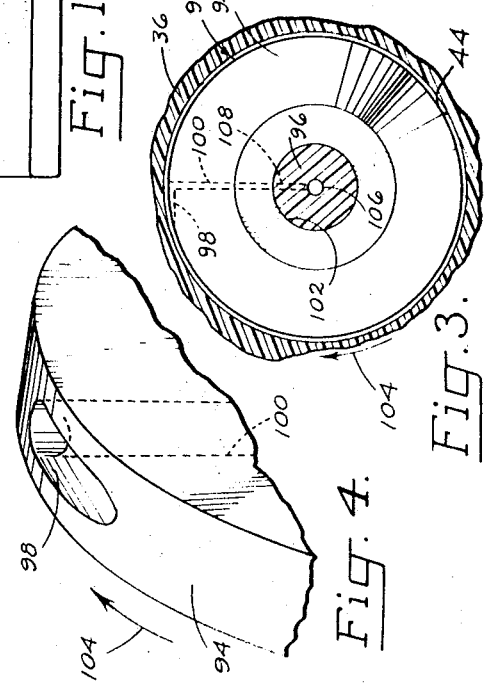
Fig. 3.
Fig. 4.
William L. King
INVENTOR
BY Kolisch & Hartwell,
Attys.

William L. King
INVENTOR
BY Kolisch & Hartwell
Attys.

LIQUID JET ELECTRICAL INVERTER

BACKGROUND AND SUMMARY OF THE INVENTION

This invention pertains to a liquid jet electrical inverter for converting DC to AC.

Inverters have a wide range of applications—many requiring the delivery of power at relatively high currents.

A general object of the present invention is to provide a novel electrical inverter which performs efficiently and reliably in converting DC to AC under a wide range of operating conditions, including those which require the delivery of relatively large currents.

More particularly, an object of the invention is to provide such an inverter which is capable of delivering a relatively high current without encountering excessive arcing or overheating problems.

The proposed inverter contemplates a rotary-type machine employing a pair of jets of an electroconductive liquid, such as mercury, as a medium for producing switching in the inverter. With the inverter operating, angularly spaced recesses in a turning rotor carry pools of mercury held against the bases (outside walls) of the recesses through centrifugal forces. Metal conductors are mounted adjacent such bases, with different conductors connected to the positive and negative terminals of a supply of DC current. As the rotor turns, the two jets which are stationary intermittently impinge the different pools in the different recesses. With liquid in one jet impinging a pool in contact with a conductor connected to the plus terminal of the DC supply, liquid in the other jet impinges a pool in contact with a conductor connected to the negative terminal of the supply. Conductors which are in electrical contact with liquid flowing in the two jets (at points upstream from where the jets impinge the pools) are connected to the two AC output terminals of the inverter.

The rotor contains at least one reservoir from which mercury is pumped to the jets with rotation of the rotor. Drains provided in the sidewalls of the recesses return excess fluid to the reservoir, and aid in maintaining a proper pool depth in the recesses.

With such construction, a number of important advantages are obtained. To begin with, switching produced through the intermittent impingement of liquid jets and rotating pools of liquid affords a good mechanism for the handling of large currents. Further, with the jets impinging liquid pools rather than solid conductors, such as those conductors in the bases of the recesses, minimal arcing and heating occurs in the inverter. As a consequence, corrosion problems are greatly reduced. This kind of performance is to be distinguished from that of prior inverters using liquid jets which directly impinge solid conductors. There, arcing and corrosion and overheating present considerable problems where high currents are involved.

DESCRIPTION OF THE DRAWINGS

These and other objects and advantages attained by the invention will become more fully apparent as the description which follows is read in conjunction with the accompanying drawings, wherein:

FIG. 1 is a side elevation, with portions broken away, of one embodiment of an inverter constructed according to the invention;

FIGS. 2 and 3 are views taken generally along the lines 2—2 and 3—3, respectively, in FIG. 1;

FIG. 4 is an enlarged fragmentary perspective view of a portion of a liquid pickup member employed in the inverter of FIG. 1;

DETAILED DESCRIPTION OF THE INVENTION

Figure 5:
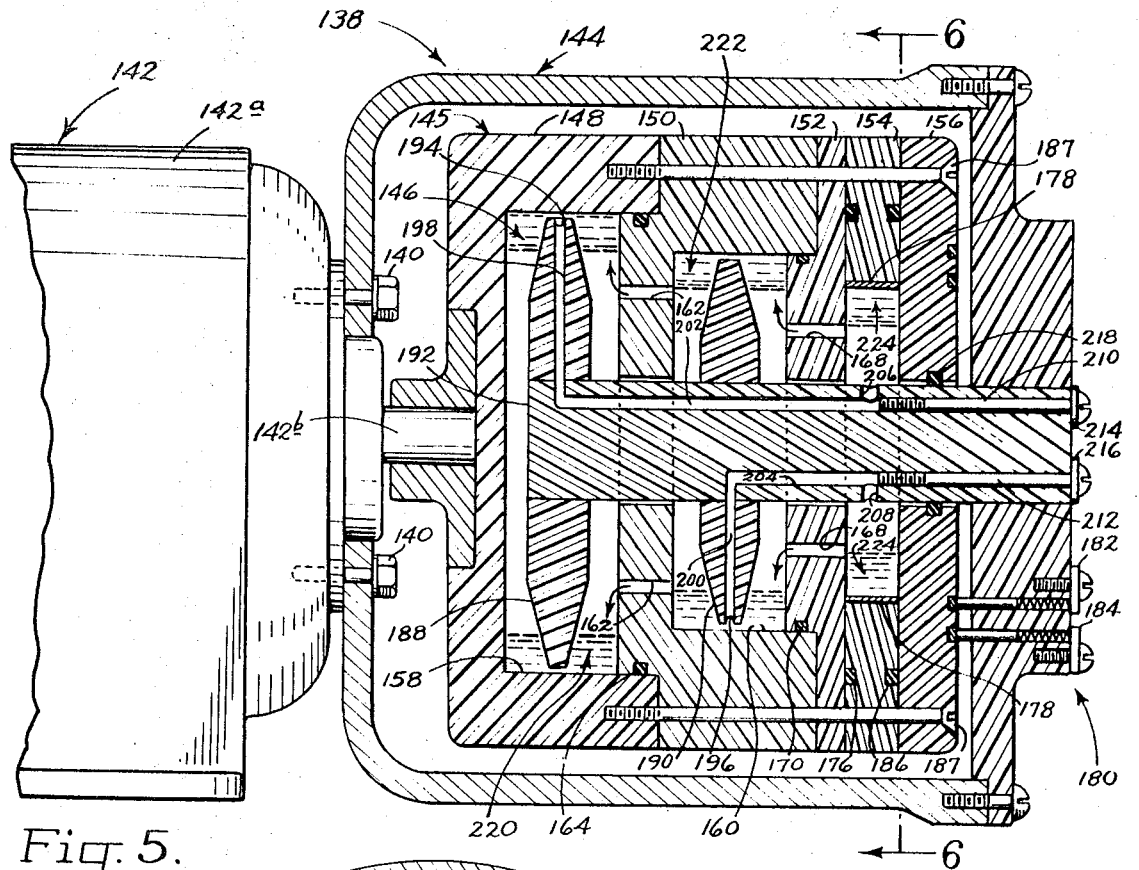
FIG. 5 is a side elevation, with portions broken away, of a modified form of inverter as contemplated herein.

Turning now to the drawings, indicated generally at 10 in FIG. 1 is a preferred embodiment of an electrical inverter constructed according to the invention. Inverter 19 includes a pair of what might be thought of as rotor-stator assemblies 12, 14 which are mounted adjacent axially opposite ends of the housing or frame 16a of an electric drive motor 16. Inverter 10 is adapted to convert DC to AC, and is capable, as will be more fully explained, of handling relatively large currents without encountering appreciable arcing or overheating problems.

Motor 16 which drives the rotors in assemblies 12, 14 is conventional, and includes an elongated output shaft 16b which extends outwardly of the axially opposite ends of frame 16a. Only the right end of shaft 16b shows in FIG. 1, the left end being concealed within assembly 12. With motor 16 operating, shaft 16b turns at a speed of about 1,800 r.p.m. The direction in which it turns is clockwise as viewed along the axis, 18, of shaft 16b from the shaft's right end in FIG. 1.

Assemblies 12, 14 are essentially the same in construction, and only assembly 14 will be described in detail herein. In general terms, assembly 14 includes a hollow stator 20, inside of which is rotatably mounted a rotor 22. Rotor 22 is also referred to herein as a rotatable unit or portion, and is adapted to turn about axis 18.

Stator 20 includes a generally cylindrical metallic rotor shroud 24, with an integral left end (in FIG. 1) which contains a central bore 26. Bore 26 freely receives the projecting part of an end support bearing for the right end of shaft 16b, with such shaft end extending axially a short distance into the shroud. Shroud 24 is anchored to frame 16a by bolts, such as bolts 28. The right end of the stator comprises a circular end plate 30 which is fastened to the shroud through bolts such as those shown at 32. Plate 30 includes an axially outwardly projecting central boss 30a. Extending axially completely through the plate is a central bore 34. Plate 30 is formed of a suitable electrical insulating material such as a plastic.

Rotor 22 in the embodiment being described comprises four axially stacked sections indicated at 36, 38, 40, 42. All of these sections are made of a material similar to that used for plate 30. Section 36 has a somewhat cup-shaped configuration, and includes a hollow, cylindrical interior defining a chamber 44. A central circular recess 46 in the left end of section 36 in FIG. 1 snugly receives (i.e., as by a press fit), a bushing 48. Bushing 48 includes a central axial bore 50 which snugly receives (i.e., also as by a press fit) the right end of shaft 16b in FIG. 1.

Section 38 has a transverse cross-sectional configuration as illustrated in FIG. 1, and fits against section 36 as shown in the figure. As can be seen, the left end portion of section 38 projects into the interior of chamber 44, and is sealed thereto by an annular seal 52. Referring to FIGS. 1 and 2 together, it will be noted that section 38, adjacent its center, includes four groups, such as groups 54, of multiple ports, such as ports 56, which extend axially completely through the section. Ports 56 constitute drains herein. These ports lie generally along a circular path centered about axis 18. In the particular embodiment illustrated, each group includes five ports, although it is appreciated that different numbers of ports may be used in a group. The groups are substantially equally angularly spaced, with each occupying a span just short of a quadrant of the circular path that the ports lie along. Inwardly of the groups of ports in section 38 is a central axial bore 58.

Still referring to FIGS. 1 and 2, section 40 takes the form of a flat circular disk having, in its axially opposite faces, circular grooves containing seals 60, 62 that seal this section to section 38, 42, respectively. At the center of section 40 is an irregular opening 64 having the outline shown in FIG. 2. The periphery of opening 64 includes four arcuate wall expanses, such as expanses 66, which have substantially the same radius (greater than the radius of the circular path along which ports 56 lie). Wall expanses 66 curve about axis 18. These wall expanses are distributed substantially equally angularly about the axis, and occupy spans just short of quadrants of a circle. In particular, each of these expanses spans an angle just slightly greater than that spanned by a group of ports. At the four adjacent sets of ends of expanses 66 are four radially inwardly extending webs 68 (see FIG. 2). Each wall expanse 66 and the webs 68 at its ends define a recess, such as recesses 70, whose function will be explained later. The inner ends of each pair of webs 68 define what is called herein an inner open side of a recess 70. The inner ends of webs 68 are disposed radially inwardly of ports 56. Rotor section 40 is mounted against section 38 with each recess 70 fully exposing all ports in a different group of ports. The plane containing rotor section 40 is referred to herein as the plane of rotation of recesses 70.

Suitably mounted against each wall expanse 66 is an arcuate conductive (metallic) strip, or element, 72. As will be more fully explained, each of these strips is connected to one of the two DC input terminals for the inverter. In the embodiment illustrated, the strips against the top and bottom wall expanses in FIGS. 1 and 2 are each connected to the positive DC input terminal; and those against the other two wall expanses are each connected to the negative DC input terminal.

Rotor section 42, like section 40, takes the form of a flat circular disk. Extending through the center of this disk is an axial bore 74 having about the same diameter as previously described bore 58. Formed in the right face of the disk are two radially spaced grooves centered about axis 18 which contain inner and outer conductive rings 76, 78, respectively. Ring 76 is suitably electrically connected (by internal wiring concealed in the rotor) to the top and bottom conductive strips 72 in FIGS. 1 and 2. Similarly, ring 78 is suitably connected to the other two strips 72.

The four rotor sections are secured together by means of bolts 80.

Conventionally mounted in previously described plate 30 at the location shown in FIG. 1 are two spring-biased electrical brushes 82, 84. The inner ends of brushes 82, 84 ride against rings 76, 78, respectively. Brushes 82, 84 are conductively connected to DC input terminals 86, 88, respectively, which in turn are connected to the positive and negative terminals, respectively, of a suitable source of DC power.

Referring now to FIGS. 1, 3, and 4, indicated generally at 90 is a liquid jet-producing means as contemplated by the invention, such comprising a stationary (i.e., nonrotating) pickup member 92. Member 92 includes a head 94, taking the form substantially of a flat circular disk, joined to the inner end of an elongated cylindrical stem 96. The outer circumferential margin of head 94 is tapered, as shown in FIG. 1, to minimize drag on rotor 22 with the inverter operating. Head 94 and stem 96 are constructed herein of a plastic electrical insulating material which may be the same as that used in the rotor sections.

Formed at one location on the periphery of head 94 is a groove, or inlet, 98 which extends generally tangentially a short distance into the head. The inner end of groove 98 communicates with a radially extending bore 100, the inner end of which opens to a central bore 102 in the head. Head 94 is disposed within chamber 44, and has an outside diameter which is slightly less than the inside diameter of the cylindrical wall of the chamber. Arrow 104 in FIGS. 3 and 4 indicates the direction that rotor 22 turns relative to head 94 with operation of the inverter. Head 94 is press-fitted onto the left end of stem 96 in FIG. 1, with such end extending into bore 102 in the head. From head 94, stem 96 extends to the right in FIG. 1 freely through bores 58, 74, and is press-fitted into bore 34 in plate 30. A seal 105 seals the inside of bore 74 to the outside of the stem.

Extending axially and centrally into the stem from its right end in FIG. 1 is an elongated bore 106. The left end of bore 106 communicates with a radially extending bore 108 in the stem which communicates with and is axially aligned with bore 100 in head 94. A bore 110 which is disposed in the plane of rotor section 40 opens to and extends between bore 106 and the outside surface of the stem. In the embodiment illustrated, the longitudinal axis of bore 110 substantially parallels the axes of bores 100, 108. The outer end of bore 110 is referred to herein as an outlet for jet-producing means 90. Bores 100, 108, 106, 110 collectively comprise what is referred to as a channel in the jet-producing means.

Secured as by screwing into the right end of bore 106 is an elongated electrically conductive metal bolt 112 whose left end in FIG. 1 extends to a point just to the right of where bores 106, 110 join. Bolt 112 is referred to herein as a conductive member in jet-producing means 90, and is connected to one of the AC output terminals, shown at 114, for the inverter.

Assembly 12 includes a stator 116, a rotor 118, and a liquid jet-producing means 120 which correspond to stator 20, rotor 22, and jet-producing means 90, respectively, in assembly 14. Jet-producing means 120 includes a head 122, corresponding to head 94, having in its periphery a groove 124 corresponding to groove 98. In the particular embodiment being described, grooves 98, 124 face in the same direction, and have substantially the same angular disposition with respect to axis 18.

Rotor 118 is anchored to the previously mentioned concealed left end of shaft 16b whereby it is interconnected, and driven in unison, with rotor 22. The sections in rotor 118 which correspond to sections 38, 40 in rotor 22 are axially aligned respectively with the latter. In other words, each group of ports in rotor section 38, and each recess in rotor section 40, is aligned axially with corresponding structure in rotor 118.

Exposed at the left side of assembly 12 in FIG. 1 is a pair of DC input terminals 126, 128 which are connected to conductive strips in the recesses in rotor 118 in the same manner as described above for terminals 86, 88, respectively. Terminal 126, 128 are suitably connected to terminals 88, 86, respectively. As a consequence, the two conductive strips in rotor 118 which are aligned with the top and bottom strips 72 in FIGS. 1 and 2 are negative; and the other two strips are positive. Also exposed at the left side of assembly 12 is a terminal 130 which corresponds to previously described terminal 114, and which constitutes the other AC output terminal for the inverter. Terminal 130 connects with a bolt 131 which corresponds to previously described bolt 112.

Rotors 22, 118 are referred to herein collectively as rotor means. The four recesses in the rotors which contain a positive conductive strip are referred to collectively as one liquid receiver means, and the other four recesses are referred to as another liquid receiver means. Similarly, the four positive conductive strips constitute one conductor means herein, and the four negative strips constitute another conductor means.

As is contemplated herein, switching action in the inverter is accomplished by jets of an electroconductive liquid. While various such liquids may be used in different applications, liquid mercury has been found to provide superior performance, and is preferred. Accordingly, rotors 22, 118 contain a supply of liquid mercury which was introduced into chamber 44, and into the corresponding chamber, 132, in rotor 118, at the time of assembly of the rotors. The exact amount of mercury which is provided depends upon the particular sizes of the parts which are used in the rotor. It will be apparent from the description below of how the inverter operates what the criteria are for including the proper amount of mercury.

With inverter 10 operating, DC power is supplied terminals 86, 88, 126, 128. Terminals 86, 128 are positive and terminals 88, 126 are negative. Motor 16 drives the rotors in assemblies 12, 14 in the direction of arrow 104.

With turning of the rotors, centrifugal forces act on the mercury in chambers 44, 132, and create annular rotating pools of mercury (such as pool 134 in chamber 44) distributed circumferentially about the cylindrical walls of the chambers. Such pools are deep enough, in a radial sense, to wet the entire peripheries of heads 94, 122. As a consequence, and because the heads and stems of the two jet-producing means are stationary, liquid mercury from the chambers pumps into the inlet grooves in the heads and through the channels formed in the heads and stems. Further explaining, and with reference to head 94 and stem 96, liquid mercury from chamber 44 flows in a steady stream into groove 98, and thence through bores 100, 108, 106, 110. Such liquid is expelled from the outer end of bore 110 in a radially outwardly projecting jet in the plane of rotation of recesses 70. Such liquid, it will be noted, contacts the inner end of bolt 112 at a point upstream from the outer end of bore 110.

Similar action characterizes the flow of mercury out of chamber 132, with such mercury contacting the inner end of bolt 131, and with the resulting jet of mercury flowing radially outwardly in the plane of rotation of the recesses corresponding to recesses 70.

Referring again particularly to the operation taking place inside assembly 14, the jet of mercury coming from bore 110 flows intermittently into successive adjacent recesses 70 with rotation of the rotor. Immediately after starting up of motor 16, mercury in this jet directly impinges conductive strips 72 in the recesses. However, in a very short period of time a pool of mercury builds up in each recess which shields the conductive strip therein from direct impingement by the jet. Such a situation is illustrated in FIGS. 1 and 2, with pools of mercury 136 shown in recesses 70. Pools 136 build up radially until they reach ports 56, whereupon excess mercury drains from the recesses through these ports and returns to chamber 44. Exactly the same kind of operation occurs within assembly 12.

With the inverter operating, it is desirable that a sufficient amount of mercury be provided in a rotor to maintain a steady circulating flow as just outlined. More specifically, there should at all times be a sufficient amount of mercury in the whirling pool inside a chamber to assure continual pumping of mercury through a jet-producing means; and there should be a sufficient pool depth in the recesses to assure shielding of the conductive strips therein against direct impingement by a jet. While the location of the drain ports in a recess, of course, affects the maintenance of a proper pool depth in the recess, the amount of mercury initially provided inside a rotor is also an important consideration. As was mentioned earlier, the exact amount of mercury required in a particular rotor depends upon the dimensions of the parts in the rotor.

With a jet flowing into a pool of mercury in a recess, it places the bolt, such as bolt 112, which is electrically in contact with the jet, at substantially the same electrical potential as the conductive strip in the recess. And, as the jet of mercury in one assembly flows into a recess having a conductive strip which is positive, it will be noted that the jet in the other assembly flows into a recess having a strip which is negative. It will be apparent, therefore, that as the rotors in assemblies 12, 14 turn, an AC voltage is developed at output terminals 114, 130 whose frequency depends upon the angular spacing of the recesses, and also upon the rotational speed of the rotors. In the case of inverter 10, an AC voltage having a frequency of about 60 cycles per second is produced.

The mercury flows created in the rotors herein have sufficiently large cross-sectional areas to be capable of carrying large currents. For example, an inverter has been constructed according to the invention which has been capable of handling currents even as high as 200–300 amperes. Switching in the inverter occurs as the outer end of a jet breaks contact with a pool in one recess and subsequently makes contact with a pool in an adjacent recess. Experience with inverters made according to the invention has shown that such switching occurs with relatively little arcing—and considerably less arcing than would occur if the jets were permitted directly to impinge the conductive strips in the recesses. Further, experience has shown that the constant circulation of mercury in the turning rotors affords a cooling effect which inhibits overheating. Ports 56, and the corresponding ports in rotor 118, preferably are sized and configured to assure breakup of the mercury into droplets as it returns to chambers 44, 132 to minimize the chance of short circuiting occurring through the pools in the chambers.

Figure 6:
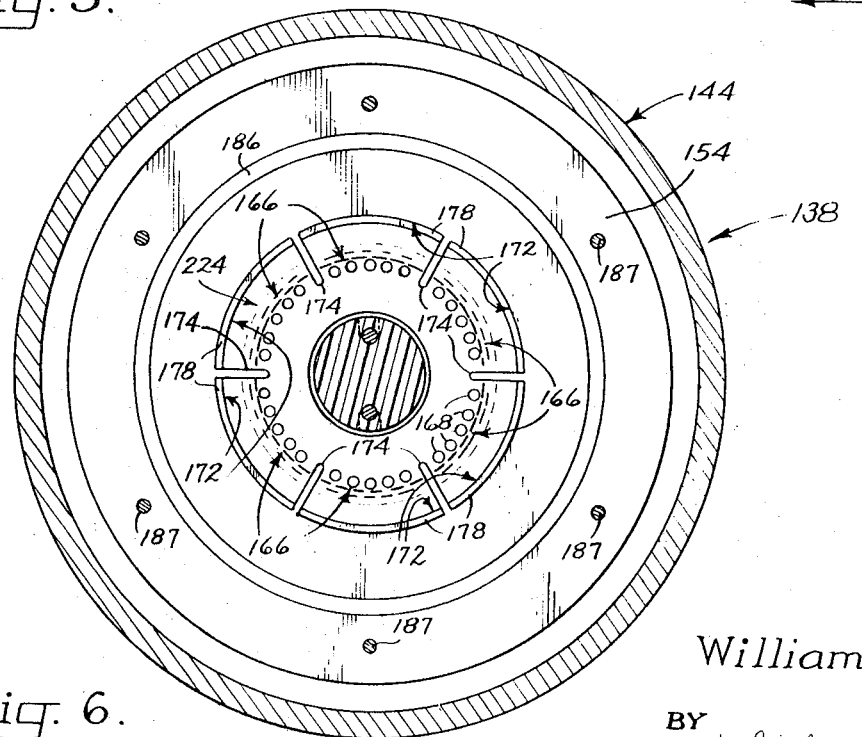
FIG. 6 is a view taken along the line 6—6 in FIG. 5.

FIGS. 5 and 6 illustrate a modification of the invention employing a single rotor-stator assembly 138. Assembly 138 is mounted through bolts, such as bolts 140, on the frame or housing 142a of an electric motor 142. Motor 142 includes an output shaft 142b, and is similar to previously described motor 16. With motor 142 operating, shaft 142b turns at a speed of about 1,200 r.p.m. in a clockwise direction as viewed along its axis from its right end in FIG. 5.

Assembly 138 is similar in many respects to assemblies 12, 14. Thus, it includes a stator 144 which is essentially the same in construction as stators 20, 116, and a rotor, or rotor means, 145 and a jet-producing means 146 which are similar somewhat to the rotors and jet-producing means in assemblies 12, 14. Rotor 145, however, includes five rather than four sections, such being indicated at 148, 150, 152, 154, 156. Sections 148, 152, 154, 156 are substantially the same in construction as rotor sections 36, 38, 40, 42, respectively, in rotor 22. Thus, section 148 includes a chamber 158 which corresponds to chamber 44, and is mounted on the right end of shaft 142b for rotation about the axis of the shaft.

Section 150 creates the principal difference between rotor 145 and rotor 22. This section defines another chamber, 160, in the rotor whose function is similar to that of chamber 158. It will be noted, however, that the diameter of the cylindrical wall of chamber 160 is somewhat smaller than that of the cylindrical wall of chamber 158. Extending axially through section 150 and communicating with chambers 158, 160 are a plurality of bores, such as bores 162. Bores 162, of which only two are shown, are distributed generally along a circular path centered about the axis of shaft 142b. These bores are positioned radially inwardly of the cylindrical wall of chamber 160. Sections 148, 150 are sealed together by an annular seal 164.

Section 152 includes six groups 166 of ports 168 distributed (as shown in FIG. 6) along a generally circular path also centered about the axis of shaft 142b. These groups of ports correspond in function to the groups previously described in rotor section 38. Sections 150, 152 are sealed together through a seal 170.

Section 154 differs from previously described rotor section 40 only in that its irregular central opening is constructed to define six equally angularly spaced recesses 172, rather than four such recesses. The ends of recesses 172 are defined by radially inwardly extending webs 174 which correspond to webs 68. Section 154 is mounted against section 152 with each recess 172 fully exposing the ports 168 in a different group 166. A seal 176 seals sections 152, 154 together.

Mounted against the arcuate outer wall expanses of recesses 172 are conductive strips, such as strips 178, which correspond to the strips 72. Through internal connections somewhat similar to those provided in assembly 14, including a brush arrangement 180 which is substantially the same as the brush arrangement previously described, adjacent strips 178 are connected to different ones of the two DC input terminals 182, 184 provided adjacent the right end of stator 144 in FIG. 5. Terminal 182 is connected to the positive terminal of a suitable source of DC power, and also to three of the strips in recesses 172. Similarly, terminal 184 is connected to the negative terminal of the DC source, and to the other three strips. It will be apparent from the construction just described that not only are adjacent strips in recesses 172 at opposite polarities, but also diametrically opposite strips are at opposite polarities.

The three recesses which contain positive conductive strips, and the other three recesses, comprise what are referred to herein as two different liquid receiver means. Similarly, the set of positive strips and the set of negative strips each constituted a different conductor means herein.

Rotor section 156 is identical to previously described rotor section 142, and seats against section 154. A seal 186 seals these two sections together. Bolts such as those shown at 187 hold the various sections of rotor 145 together.

Jet-producing means 146 includes a pair of heads 188, 190, which are similar to the heads previously described, and an elongated cylindrical stem 192 which is similar to stem 96. Heads 188, 190 are sized to fit properly within chambers 158, 160, respectively, and are anchored (as by press-fitting) at different axial locations on stem 192. Heads 188, 190 include inlet grooves 194, 196, respectively, on their outer peripheries which communicate with radially inwardly extending bores 198, 200, respectively. Grooves 194, 196 are disposed on diametrically opposite sides of the axis of shaft 142b, and face in opposite directions. More specifically, groove 194 faces toward, and groove 196 faces away from, the viewer in FIG. 5.

Bores 198, 200 communicate with the inner ends of elongated axially extending bores 202, 204, respectively, provided in stem 192. Bores 202, 204 in turn communicate with the inner ends of radially outwardly extending bores 206, 208, respectively. Bores 206, 208 are disposed within the plane of rotor section 154, and are substantially axially aligned. Electrically conductive bolts 210, 212 extend into the right ends of bores 202, 204, respectively, and are connected to the AC output terminals 214, 216, respectively, of the inverter. Bolts 210, 216 correspond to previously described bolts 112, 131.

It will be noted that stem 192 extends freely through central accommodating bores provided in rotor sections 150, 152, 156. A seal 218 seals the outside of the stem to the inside of the central bore in section 156. The right end of stem 192 is anchored to stator 144 in much the same manner as the right end of previously described stem 96 is anchored to stator 20.

During the assembly of rotor 145, liquid mercury in suitable quantity is provided in chambers 158, 160. With motor 142 operating, whirling annular pools of mercury 220, 222 are formed in these chambers. These pools wet the entire peripheries of heads 188, 190, respectively. With rotation of the rotor relative to the heads, mercury is pumped from chamber 158 through inlet groove 194 and bores 198, 202, 206 to form one jet. Similarily, mercury is pumped from chamber 160 through inlet groove 196 and bores 200, 204, 208 to form another jet. As a consequence, pools of mercury, such as pools 224, build up in recesses 172, shielding conductive strips 178. Excess mercury in recesses 172 drains through ports 168 to chamber 160. In like fashion, excess mercury in chamber 160 drains through bores 162 to chamber 158. As in the case of previously described ports 56, ports 168 and bores 162 are sized and configured to assure that mercury discharging therefrom is broken up into droplets.

With DC power supplied input terminals 182, 184, AC power at a frequency of about 60 cycles per second is provided at output terminals 214, 216.

The same advantages with respect to arcing and overheating are obtained in this modification, as well as in the first embodiment described.

While a preferred embodiment, and one modification, of the invention have been described herein, it is appreciated that variations and modifications may be made without departing from the spirit of the invention.

It is claimed and desired to secure by Letters Patent

1. In a liquid jet cyclically operable electrical inverter
a pair of input terminals adapted to be connected to a source of DC current and a pair of output terminals for supplying AC current,
first and second rotatable portions each including a recess having an inner open side exposing an outer wall expanse which is spaced radially from said open side and from the axis of rotation of the rotatable portion,
means operatively interconnecting said first and second rotatable portions for coordinated simultaneous rotation,
a conductive element for each recess mounted therein adjacent the outer wall expanse thereof, with each conductive element conductively connected to a different input terminal,
first and second liquid jet-producing means each operable to produce a jet of electroconductive liquid directed whereby with rotation of the two rotatable portions, the jet flows intermittently through the open side of at least one of said recesses to form a pool of liquid with such pool disposed against the outer wall expanse of the recess and in contact with the conductive element in the recess, and with the pool after formation shielding the conductive element in the recess from direct impingement by the jet,
said two jet-producing means being positioned relative to said first and second rotatable portions whereby during one part of a cycle of operation of said inverter with liquid in one jet flowing into one of said recesses, liquid in the other jet flows into the other recess, and
a conductive member for each jet-producing means positioned to contact liquid flowing in the jet produced thereby at a point upstream from where the jet impinges a pool of liquid in a recess, each conductive member being conductively connected to a different one of said output terminals.

2. The inverter of claim 2 which further comprises, for each recess, a drain opening thereto at a point disposed radially inwardly of the conductive element in the recess for draining excess fluid from the latter.

3. The inverter of claim 2, wherein the outer wall expanse of a recess is arcuate, with all points thereon substantially equidistant from the axis of rotation of the rotatable portion containing the recess.

4. The inverter of claim 3, wherein the conductive element in a recess comprises an elongated metallic strip curved along its length positioned adjacent the arcuate outer wall expanse of the recess.

5. The inverter of claim 1, wherein said first and second rotatable portions each includes another recess similar to but spaced angularly from the first-mentioned recess, said other recess in the case of each rotatable portion containing a conductive element conductively connected to an input terminal different from the input terminal associated with the conductive element in the first-mentioned recess in the rotatable portion.

6. The inverter of claim 5, wherein during another part of each cycle of operation thereof liquid in said one jet flows into the second-mentioned recess in the same rotatable portion which contains said one first-mentioned recess at the same time that liquid in said other jet flows into the second-mentioned recess in the same rotatable portion which contains said other first-mentioned recess.

7. A liquid jet electrical inverter comprising
a pair of input terminals adapted to be connected to a source of DC current, and a pair of output terminals for supplying AC current,
a pair of rotatable units each including a pair of angularly displaced recesses with each recess in a unit having an inner open side exposing an outer wall expanse which is spaced radially from said open side and from the axis of rotation of the unit,
a conductive element for each recess mounted adjacent the outer wall expanse thereof, with each conductive element on a unit connected to a different one of said input terminals,
liquid jet-producing means for each unit, each operable to produce a jet of electroconductive liquid which, with rotation of the associated unit, flows radially outwardly relative to the rotational axis thereof alternately through the open sides of the recesses in the unit to form pools of such liquid disposed against the outer wall expanses of the recesses and in contact with the conductive elements in the recesses, such pools when formed shielding the conductive elements from direct impingement by said jet,
a conductive member for each jet-producing means positioned to contact liquid flowing in the jet produced thereby at a point upstream from where the jet impinges the pool of liquid in a recess, each conductive member being conductively connected to a different one of said output terminals, and
drive means drivingly connected to said rotatable units operable to produce related rotation thereof whereby as a liquid jet for one unit flows into the recess therein containing a conductive element connected to one of said input terminals, the liquid jet for the other unit flows into the recess therein containing a conductive element connected to the other input terminal.

8. The inverter of claim 7 which further comprises for each recess a drain opening thereto at a point disposed radially inwardly of the conductive element in the recess for draining excess fluid from the latter.

9. The inverter of claim 8 which further comprises, for each rotatable unit, means operatively connected thereto and rotatable therewith defining a hollow, generally cylindrical chamber for containing electroconductive liquid, said chamber being positioned with its axis substantially coinciding with the axis of rotation of the unit, and wherein the liquid jet-producing means for the unit comprises a stationary pickup member disposed within said chamber including an inlet positioned adjacent the curved wall of the chamber.

10. The inverter of claim 9, wherein the liquid jet-producing means for a unit further comprises an elongated stem extending axially between the pickup member for the jet-producing means and the plane of rotation of the open sides of the recesses in the unit, means defining an elongated channel for carrying liquid extending from the inlet in the pickup member and into said stem to a point adjacent said plane of rotation, and means communicating with said channel defining a radially extending outlet for directing a jet of liquid radially outwardly of the stem in said plane of rotation.

11. The inverter of claim 8, wherein the outer wall expanse of a recess is arcuate, with all points thereon substantially equidistant from the axis of rotation of the unit containing the recess.

12. The inverter of claim 11, wherein the conductive element in a recess comprises an elongated metallic strip curved along its length positioned adjacent the arcuate outer wall expanse of the recess.

13. The inverter of claim 7, wherein said rotatable units are mounted for rotation on a substantially common axis.

14. A liquid jet electrical inverter comprising
a pair of input terminals adapted to be connected to a source of DC current, and a pair of output terminals for supplying AC current,
a rotatable unit including a plurality of pairs of angularly displaced recesses, with each recess having an inner open side exposing an outer wall expanse which is spaced radially outwardly from said open side and from the rotational axis of the unit,
a conductive element for each recess mounted adjacent the outer wall expanse thereof, with the conductive elements in adjacent recesses connected to different ones of said input terminals,
liquid jet-producing means operable to produce a pair of jets of electroconductive liquid which, which rotation of said unit flow generally radially outwardly relative to said rotational axis, and at an angle to one another, intermittently through the open sides of the recesses in the unit, said jets forming pools of such liquid disposed against the outer wall expanses of the recesses and in contact with the conductive elements in the recesses, such pools when formed shielding the conductive elements from direct impingement by said jets,
the angle between said jets being such that with liquid in one jet flowing into a recess containing a conductive element connected to one of said input terminals, liquid in the other jet flows into another recess containing a conductive element connected to the other input terminal, and
a conductive member for each jet positioned to contact liquid therein at a point upstream from where the jet impinges a pool in a recess, each conductive member being conductively connected to a different one of said output terminals.

15. A liquid jet electrical inverter comprising
a pair of input terminals adapted to be connected to a source of DC current and a pair of output terminals for supplying AC current,
rotor means including a pair of spaced-apart liquid receiver means,
conductor means for each liquid receiver means, each conductor means being connected to a different input terminal,
liquid jet-producing means operable to produce a pair of spaced-apart jets of electroconductive liquid which, with rotation of said rotor means, flow intermittently into said liquid receiver means to form pools of such liquid in contact with said conductor means, such pools when formed shielding the conductor means from direct impingement by said jets, and each jet when impinging such a pool being placed electrically in contact with the conductor means contacted by the pool,
said jets being oriented whereby with liquid in one jet impinging a pool in contact with one of said conductor means, liquid in the other jet impinges a pool in contact with the other conductor means, and
a conductive member for each jet positioned to contact liquid therein at a point upstream from where the jet impinges a pool, each conductive member being conductively connected to a different one of said output terminals.

UNITED STATES PATENT OFFICE
CERTIFICATE OF CORRECTION

Patent No. 3,612,980  Dated  October 12, 1971

Inventor(s) William L. King

It is certified that error appears in the above-identified patent and that said Letters Patent are hereby corrected as shown below:

On the cover sheet [73] "Nathan E. Knecht" should read -- by direct and Mesne assigts 50% each to Nathan E. Knecht and Wayne R. Atwood Trustee for the Ram Trusts Nos. 1-28, as joint owners. -- .

Signed and sealed this 12th day of December 1972.

(SEAL)
Attest:

EDWARD M. FLETCHER, JR.
Attesting Officer

ROBERT GOTTSCHALK
Commissioner of Patents